(12) United States Patent
Quist et al.

(10) Patent No.: US 7,319,677 B2
(45) Date of Patent: Jan. 15, 2008

(54) NETWORK TOPOLOGY MAPPER

(75) Inventors: Daniel A. Quist, Los Alamos, NM (US); Eugene M. Gavrilov, Los Alamos, NM (US); Michael E. Fisk, Jemez, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 594 days.

(21) Appl. No.: 11/016,096

(22) Filed: Dec. 17, 2004

(65) Prior Publication Data
US 2006/0133297 A1 Jun. 22, 2006

(51) Int. Cl.
*H04L 12/28* (2006.01)
(52) U.S. Cl. ..................................... 370/254
(58) Field of Classification Search ............... 370/254, 370/255, 256, 257, 258; 709/220, 221
See application file for complete search history.

(56) References Cited

U.S. PATENT DOCUMENTS

| 6,697,338 B1 | 2/2004 | Breitbart et al. | |
| 2003/0051032 A1* | 3/2003 | Schenkel et al. | 709/224 |
| 2004/0090943 A1* | 5/2004 | da Costa et al. | 370/338 |
| 2007/0143499 A1* | 6/2007 | Chang | 709/245 |

OTHER PUBLICATIONS

Yuri Breitbart, Minos Garofalakis, Cliff Martin, Rajeev Rastogi, S. Seshadri, Avi Silberschatz, "Topology Discovery in Heterogeneous IP Networks," Information Sciences Research Center, Bell Labs, pp. 265-274, 2000, yuri, minos, rastogi, seshadri, avi@bell-labs.com.

Yigal Bejerano, Yuri Breitbart, Minos Garofalakis, Rajeev Rastogi, "Physical Topology Discovery for Large Multi-Subnet Networks," Bell Labs, Lucent Technologies, pp. 342-352, 2003.

David T. Stott, "Layer-2 Path Discovery Using Spanning Tree MIBs," Avaya Labs Research, Avaya, Inc., pp. 1-23, 2002, stott@research.avayalabs.com.

Josef Glasmann, Marie-Melisande Tromparent, "Topology Discovery in the Context of Resource Management in IP-Networks," Technische Universitat Munchen, 5 pages, {Glasmann Tromparent}@ei.tum.de, 2002.

Emden R. Gansner and Stephen C. North, "An Open Graph Visualization System and its Applications to Software Engineering," Software Practice and Experience, vol. 30, pp. 1203-1233, 2000.

Robert Inkret, "Protection and Restoration Strategies for IP Over WDM Networks," Department of Telecommunications, University of Zagreb, pp. 1-16, inkret@tel.fer.hr, 2000.

* cited by examiner

*Primary Examiner*—Ajit Patel
(74) *Attorney, Agent, or Firm*—Ray G. Wilson

(57) ABSTRACT

A method enables the topology of an acyclic fully propagated network to be discovered. A list of switches that comprise the network is formed and the MAC address cache for each one of the switches is determined. For each pair of switches, from the MAC address caches the remaining switches that see the pair of switches are located. For each pair of switches the remaining switches are determined that see one of the pair of switches on a first port and the second one of the pair of switches on a second port. A list of insiders is formed for every pair of switches. It is determined whether the insider for each pair of switches is a graph edge and adjacent ones of the graph edges are determined. A symmetric adjacency matrix is formed from the graph edges to represent the topology of the data link network.

9 Claims, 3 Drawing Sheets

NETWORK TOPOLOGY MAPPER

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to communication networks, and, more particularly, to network topology reconstruction.

BACKGROUND OF THE INVENTION

Communication networks are often modeled as an open system interconnected seven layer reference model. Layer 3 (network layer, e.g., routers) and Layer 2 (data link layer, e.g., switches, bridges, and hubs) are particularly important layers with respect to overall network performance and vulnerability. Layers 2 and 3 are further characterized by the "topology" of the layer, i.e., a set of devices and the connections between them. Knowledge of the topography of a layer is of particular importance in network management tasks such as failure analyses and isolating locations in a network that have been infected by worms propagated over the internet.

Topology discovery has been studied at various levels, including layer 2 Ethernet topology discovery, to provide a capability to reconstruction layer topology of an existing network. There have been several discovery algorithms studied for recovering layer 2 Ethernet topologies from information collected from simple network management protocols (SNMP). Breitbart, et al., "Topology Discovery in Heterogeneous IP Networks," *Proceedings of IEEE INFOCOM*, 2000, pp. 265-274, take the approach of assuming all nodes are connected and then identifying contradictory information. Lowekamp et al., "Topology Discovery for Large Ethernet Networks," *Proceedings of ACM SIGCOMM*, August 2001, pp. 237-248, uses a similar approach with a focus on incomplete (not fully propagated) forwarding tables. Most recently, Bejerano, et al., "Physical Topology Discovery for Large Multi-Subnet Networks," *Proceedings of IEEE INFOCOM*, 2003, provide more complex algorithms with a guarantee of recovering all available information from the raw data. David T. Stott, "Layer-2 Path Discovery Using Spanning Tree Mibs," Tech. Rep. ALR-2002-004, March 2002, teaches an approach that uses SNMP access to the results of the Spanning Tree Protocol that is run on each switch.

Topology reconstruction may be used to determine quality of service problems that might arise from the deployment of internet protocol (IP) telephony on actual networks. The ability to reconstruct topologies also may be used extensively in commercial network management systems.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method for discovering the topology of a network. A list of switches that comprise the network is formed and the MAC address cache for each one of the switches is determined. A list of insiders is formed for every pair of switches. It is determined whether the insider for each pair of switches is a graph edge and adjacent ones of the graph edges are determined. A symmetric adjacency matrix is formed from the graph edges to represent the topology of the data link network.

In another aspect of the present invention, the MAC tables of switches of an acyclical interconnected network are fully propagated. At least one edge in the interconnected network that directly or indirectly connects first and second switches on first and second ports, respectively, is discovered. First vertices seen from the first switch are determined from ports other than the first port using a MAC cache in the first switch of the edge. Second vertices seen from the second switch are determined from ports other than the second port using a MAC cache in the second switch of the edge. The first vertices are propagated to the MAC cache of the second switch and the second vertices are propagated to the MAC cache of the first port. The above steps are repeated for all other edges recovered from the interconnected network, and the entire process is repeated until the MAC tables in the switches are fully propagated.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

In the high-level architecture of a data communication system, a set of routers is configured to supply data in, e.g., the form of Netflow or Lightweight Flow Accounting Protocol (LFAP), to a central collection point. In practice a detailed knowledge of network topology for either one subnet of switches, or the like, or several adjacent subnets connected through the routers, is crucial. There are several important reasons for that: general management and administration, security, and network optimization. For large organizations that manage hundreds of computers on their complex network, the actual topology is complicated and changes with time even without any physical change in cabling or wiring. In a typical subnet of a computer network, there are a variety of hosts, e.g., routers, computers, and the like, that are physically attached to switches either directly or through hubs. The switches provide communication through the subnet as well as route the traffic bound to the outside of the subnet to one or several subnet routers.

In the case of switched Ethernet, a medium address control (MAC) table on each switch will represent the table of some of the MAC addresses of computers, routers and switches on the subnet and the corresponding tags of physical ports on a switch that sees those MACs. A switch looks at the destination address of each data frame received on a link, and then, based on information contained in the switch, the switch forwards the frame only onto the link, or links, where the destination MAC address exists. The switch can contain this information in a MAC address look-up table. For practical implementation of the algorithm herein, it is assumed that the actual topology of a communication network does not have cycles, i.e., more than one path from a switch to a router. This is a reasonable assumption due to the conventional use of the spanning tree protocol to avoid cycles among Ethernet switches.

Figure 1:
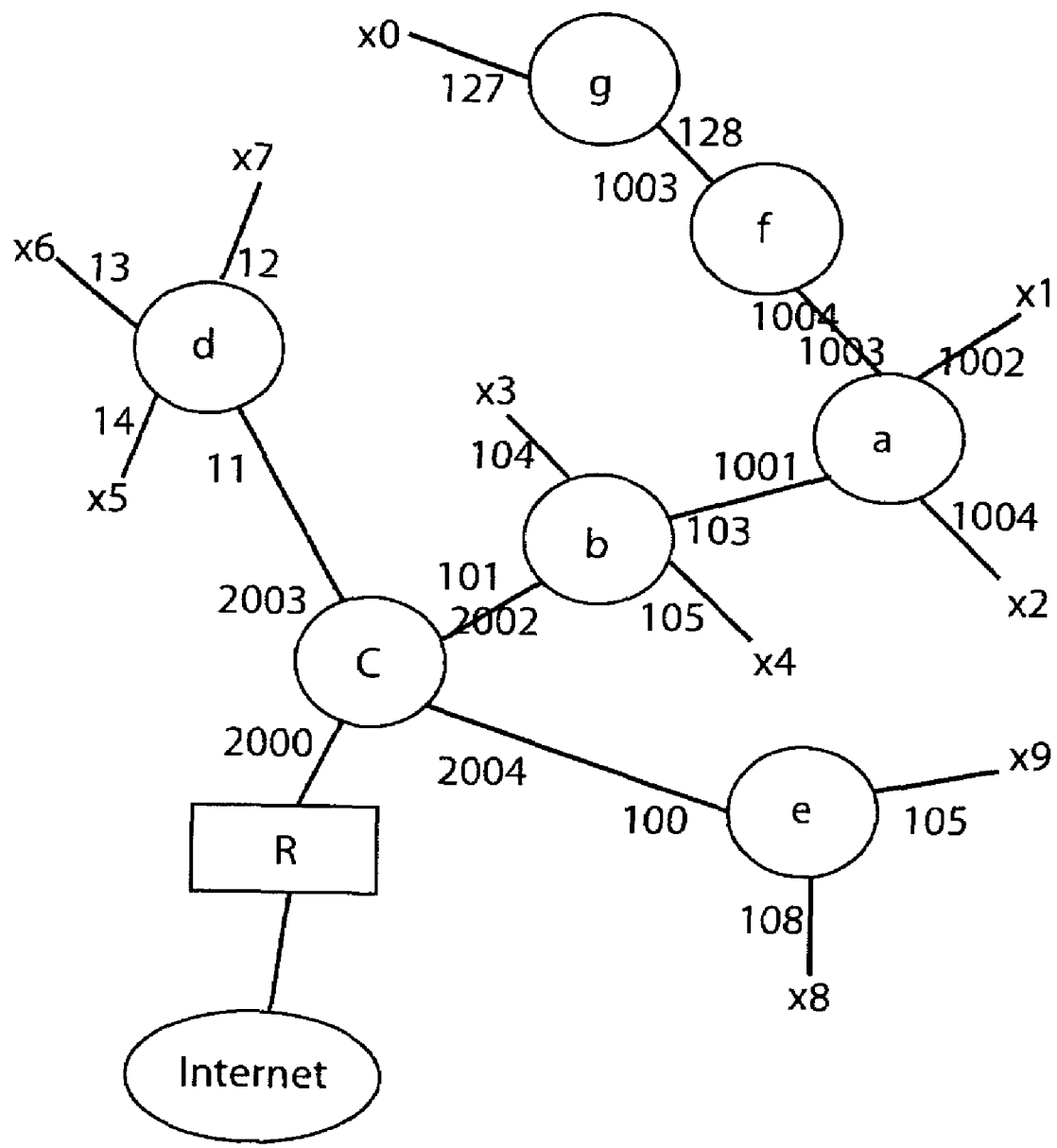
FIG. 1 is an exemplary network to illustrate the process of the present invention.

FIG. 1 is an exemplary illustration of the problem stated above. A subnet is provided with switches, marked by the letters from a to g, computer hosts marked x0 through x9, and router R connecting this subnet to the Internet. The switch port numbers (or port tags) are also illustrated.

If, at some given moment of time, each of the switches has in its MAC cache the information about all of the computers on the subnet, it is called a "fully propagated" graph. For this example, for a fully propagated graph, each switch a-g will have a MAC address cache that might look like the one presented in Table 1.

TABLE 1

| SWITCH a | | SWITCH b | | SWITCH c | |
|---|---|---|---|---|---|
| MAC | POR | MAC | POR | MAC | POR |
| f | 1003 | x3 | 104 | x3 | 2002 |
| x1 | 1002 | x4 | 105 | x4 | 2002 |
| x2 | 1004 | a | 103 | a | 2002 |
| b | 1001 | f | 103 | f | 2002 |
| g | 1003 | x1 | 103 | x1 | 2002 |
| x0 | 1003 | x2 | 103 | x2 | 2002 |
| x3 | 1001 | g | 103 | g | 2002 |
| x4 | 1001 | x0 | 103 | x0 | 2002 |
| c | 1001 | c | 101 | R | 2000 |
| R | 1001 | R | 101 | d | 2003 |
| d | 1001 | d | 101 | e | 2004 |
| e | 1001 | e | 101 | x5 | 2003 |
| x5 | 1001 | x5 | 101 | x6 | 2003 |
| x6 | 1001 | x6 | 101 | x7 | 2003 |
| x7 | 1001 | x7 | 101 | x8 | 2004 |
| x8 | 1001 | x8 | 101 | b | 2002 |
| x9 | 1001 | x9 | 101 | x9 | 2004 |

Figure 2:
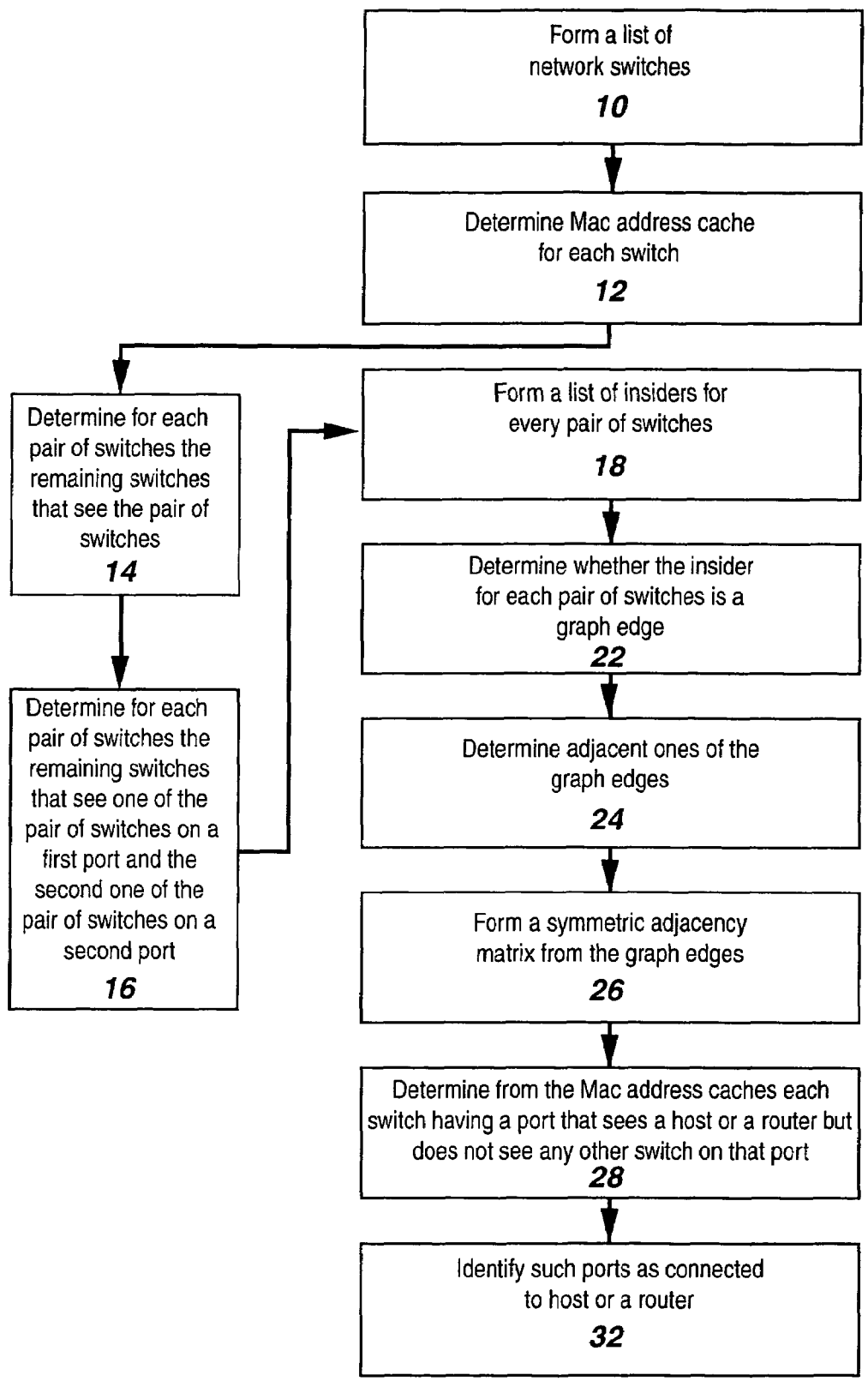
FIG. 2 is a flow chart of the process of the present invention.

The goal then is to find the algorithm that will recover the topology of the network from the MAC tables from all the switches on the subnet. With reference to FIG. 2, the following computer implemented process determines the topology of a network data link according to the present invention:

forming a list of switches that comprise the network 10;

determining the MAC address cache for each one of the switches 12;

determining for each pair of switches from the MAC address caches the remaining switches that see the pair of switches 14;

determining for each pair of switches the remaining switches that see one of the pair of switches on a first port and the second one of the pair of switches on a second port 16;

forming a list of insiders (see below) for every pair of switches 18;

determining whether the insider for each pair of switches is a graph edge 22;

determining adjacent ones of the graph edges 24;

forming a symmetric adjacency matrix from the graph edges to represent the topology of the data link network 26;

determining from the MAC address caches each switch having a port that sees a host or a router but does not see any other switch on that port 28; and determining the network data link connections to hosts and routers forming a full network 32.

To explain the algorithm it is convenient to introduce definitions here. Switch a sees switch b and denotes it as a→b if the MAC table of switch a has a record of switch b. The port number on switch a which sees b is denoted as $P_a(b)$. Using the example in Table 1, b→f and $P_b(f)=103$.

Now, assume a fully propagated (means each switch has information about all hosts and switches on the network), acyclic graph, i.e., a graph with only one path from a switch to any router. For any two vertices (switches, hosts, routers, etc.) $s_i$, $s_j$ of the graph, there is a path that connects these vertices and visits some number of other vertices along the way. Define insiders as the set of vertices that belong to that path and denote it as $I(s_i, s_j)$. It is obvious that $I(s_i, s_j) = I(s_j, s_i)$ for an acyclic graph. The length or number of edges in the path between two nodes is denoted as $L(I(s_i, s_j))$.

Returning to the example in FIG. 1, $I(d, a)=\{c, b\}$, $L(I(d, a))=3$, $I(d, b)=\{c\}$, $I(e, c)=\emptyset$. The symbol E denotes the set of all edges in a graph, where an edge is a path connecting adjacent vertices. The vertices of the graph are the switches.

In accordance with one aspect of the present invention, the present exemplary process provides a solution:

1. Form the list of switches for the network of interest.

2. For all switches in the list investigate all of their possible pairs $s_i$ and $s_j$. This can be done by forming the double loop (steps 14 and 16 shown in FIG. 2) over the list of switches.

3. For every pair of switches $s_i$ and $s_j$ form the list of the insiders $I(s_i, s_j)$ (see algorithm below).

4. If $s_i \rightarrow s_j$ and $s_j \rightarrow s_i$ and $I(s_i, s_j)=\emptyset$, then there exists a graph edge $e=(s_i, s_j)$.

5. If $s_i \rightarrow s_j$ and $s_j \rightarrow s_i$ and $I(s_i, s_j)=\{s_k\}$ (or $L(I(s_i, s_j))=2$), then it can be concluded that there are two adjacent edges in the graph $(s_i, s_k)$, $(s_k, s_j) \in E$. Here, $s_k$ is some other switch and adjacent means directly connected to both $s_i$, and $s_j$.

6. If $s_i \rightarrow s_j$ and $s_j \rightarrow s_i$ and $L(I(s_i, s_j)) \geq 3$, then it is impossible to unambiguously conclude about the path structure connecting vertices $s_i$ and $s_j$.

7. From the set of all recovered edges $E=\{(\ldots), \ldots, (\ldots)\}$ form a symmetric adjacency matrix M.

The adjacency matrix represents direct links between communicating components. The matrix elements are usually set to value of one if there is direct link between the components and zero if otherwise. For example, if switch $s_i$ is directly connected to switch $s_j$ then $M_{ij}=1$ and, $M_{ji}=1$; if they are not then $M_{ij}=M_{ji}=0$. The matrix represents all the communication links and hence is the network topology map. The adjacency matrix can be easily used to construct the topological graph representing the network(s). Table 2 below shows the adjacency matrix for the example depicted in FIG. 1.

TABLE 2

| | a | b | c | d | e | f | g |
|---|---|---|---|---|---|---|---|
| a | 0 | 1 | 0 | 0 | 0 | 1 | 0 |
| b | 1 | 0 | 1 | 0 | 0 | 0 | 0 |
| c | 0 | 1 | 0 | 1 | 1 | 0 | 0 |
| d | 0 | 0 | 1 | 0 | 0 | 0 | 0 |
| e | 0 | 0 | 1 | 0 | 0 | 0 | 0 |

TABLE 2-continued

|   | a | b | c | d | e | f | g |
|---|---|---|---|---|---|---|---|
| f | 1 | 0 | 0 | 0 | 0 | 0 | 1 |
| g | 0 | 0 | 0 | 0 | 0 | 1 | 0 |

From the example shown in FIG. 1, it can be seen that, for the algorithm to work, a method is needed to find the way to determine the insider's path between any two vertices. Fortunately, it is rather easy to do if information about switch ports is known, and that information is available from the MAC tables. Indeed, for any two vertices (switches) $s_i$ and $s_j$, the following algorithm is presented:

1. Obtain MAC cache addresses over the list of all switches. Exclude $s_i$ and $s_j$ from that list and check the port connections to determine which switches from the rest of the list see $s_i$ and $s_j$. This is done by checking the MAC tables of each remaining switch to determine if there are records of $s_i$ and $s_j$ in those tables.

2. If switch $s_k$ sees $s_i$ on one port and sees switch $s_j$ on another port or $P_{sk}(s_i) \neq P_{sk}(s_j)$, then $s_k$ belongs to the path between $s_i$ and $s_j$ or $s_k \in I(s_i, s_j)$. If, on the other hand $P_{sk}(s_i) = P_{sk}(s_j)$, then $s_k \notin (s_i, s_j)$. In this case, if $s_k$ was in $I(s_i, s_j)$, then there would be a cycle in the graph, which would violate the initial assumption.

The recovery of the full network topology and not just the graph layout for the switches implies the recovery of all other hosts and router(s) that belong to the subnet. Given the fact that the topology of the switch layout is now known, the positions of all other hosts can be estimated quite easily. In fact it will take no more then $n^2$ operations, where n is the number of hosts on the subnet, to recover the positions on the graph of all other hosts and/or routers. If the location of a particular host $x_i$ on the graph is of interest, all that is needed is to check all n MAC tables for the ports which see the host $x_i$. The procedure is as follows.

1. Initiate a SNMP software query to obtain the MAC cache addresses from the MAC tables for each switch.
2. If for some switch $s_j$ there is a MAC table that shows that computer $x_i$ is seen on some port and, at the same time, there is some other switch, say, $s_k$, visible from the same port, i.e., $P(x_i) = P(s_k)$, then $x_i$ is not directly connected to $s_j$. If there is a switch that sees $x_i$ and does not see any other switches on the same port, this switch has direct link to the computer $x_i$.

The position of the router(s) on the graph can be determined in the same way the position of any other hosts is determined.

It is the convention to represent a network as an undirected tree graph and to associate the position of the router on the graph with the head of the tree. Hence, the total amount of operations required to recover the full network topology is the sum of order $n^3$ operation for the recovery of the topology of switches and $n^2$ operation to recover the positions of n hosts. The algorithm presented above makes use of the information about the ports and takes advantage of this information to make the whole procedure for estimating the graph a straightforward procedure.

Figure 3:
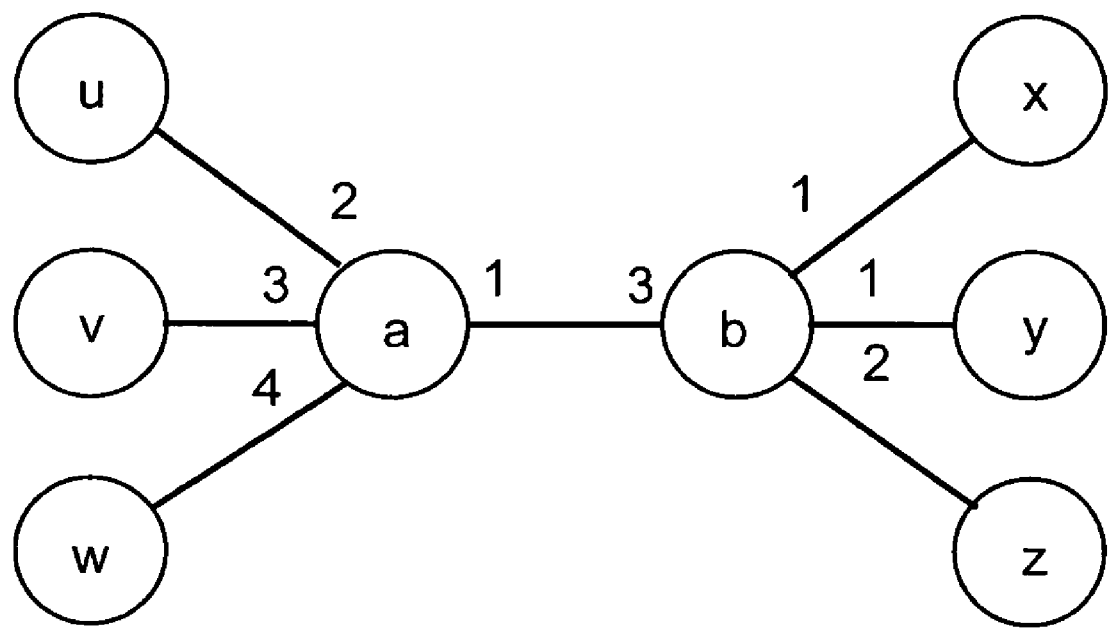
FIG. 3 is an exemplary schematic to illustrate propagation characteristics of the process.

Fully propagated MAC tables are needed for the above algorithms to work without ambiguity. In practice, the MAC tables may not be fully propagated and usually due to switch timeouts or other engineering constraints the MAC tables contain only partial information about hosts and switches. Taking the assumption that communication algorithms, like spanning-tree and the like, form acyclic communication graphs, routing information can be artificially propagated and the algorithm used in an iterative way to form fully propagated artificial MAC tables for use in the process shown in FIG. 2. For example, consider FIG. 3. At least one edge of the interconnect can be recovered using the process shown in FIG. 2; e.g., it is determined that nodes a and b are directly or indirectly connected using port 1 on a and port 3 on b, then the routes to all of the other vertices (switches) and hosts connected to those switches that b can reach on ports not equal to 3 are propagated to a. In this example, a will be given routes to x, y, and z on its port 1 and b will acquire routes to u, v, and w on its port 3. The actual MAC tables are modified with the information that was inferred from the fact that at least one communication link was recovered.

It is interesting to notice that if, for example, switch a and switch b have another switch or switches sitting on some path that connects a and b, the tables could still be propagated as long as it is reliably determined that there is a path between a and b.

The route propagation algorithm is repeated until the topology converges and there are no new routes to propagate. A fully propagated graph for a network of n nodes implies that each node knows about each other node for a total of n forwarding entries. Starting with a network containing a minimum of 3 entries (2 to determine a path between two nodes plus at least one entry to propagate), and assuming a conservative maximum of 1 entry added per iteration, the number of iterations this algorithm will run can be loosely bound by no more than $n^2$. In practice, more than 3 iterations have rarely been required before convergence.

For the practical implementation of the algorithm, one needs to get access to the MAC tables on the switches. To accomplish the task one would either get the list of switches from his or her network administrator or run available scanning tools (e.g. nmap) to discover active hosts and then attempting SNMP requests to all discovered devices.

To support dynamic networks with frequent changes of hosts and switches, a scanning tool is often run first to discover switches. As a side-effect, this invokes also the updates of the MAC caches on switches. The SNMP requests are then sent to collect the MAC tables. From MAC tables the complete tree is recovered using the algorithms presented above.

The topology discovery software was implemented in C++ using extensively the STL library (Standard Template Library is part of ANSI/ISO C++ standard and is provided by the C++ compiler vendors). The switch manager is written in Python. The Net-SNMP package (a descendent of the UC Davis and CMU SNMP code bases) was used to implement a multi-threaded version of snmpwalk to collect information from the subnet switches simultaneously. The overall time that it takes to get the map of a full 24 subnet is of the order of 1 minute.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for discovering the topology of a network data link subnet comprising:
   (a) forming a list of switches that comprise the network;
   (b) determining a MAC address cache for each one of the switches;
   (c) forming from the MAC address caches a list of insiders for every pair of switches;
   (d) determining whether the insider for each pair of switches is a graph edge;
   (e) determining adjacent ones of the graph edges; and
   (f) forming a symmetric adjacency matrix from the graph edges to represent the topology of the network.

2. The method of claim 1, wherein forming a list of insiders further comprises:
   (g) determining for each pair of switches all remaining switches that see that pair of switches;
   (h) forming the list of insiders by determining for each pair of switches the remaining switches that see one of the pair of switches on a first port and the second one of the pair of switches on a second port.

3. The method of claim 1, further comprising
   (i) determining connections of the network data link to hosts and routers forming a full network.

4. The method of claim 3, further including:
   (j) determining from the MAC address caches each switch having a port that sees a host or a router but does not see any other switch on that port.

5. A method for propagating MAC tables in switches of an acyclical interconnected network comprising:
   (a) recovering at least one edge in the interconnected network directly or indirectly connecting first and second switches on first and second ports, respectively;
   (b) determining from a MAC cache in the first switch of the edge first vertices seen from the first switch from ports other than the first port;
   (c) determining from a MAC cache in the second switch of the edge second vertices seen from the second switch from ports other than the second port;
   (d) propagating the first vertices to the MAC cache of the second switch and the second vertices to the MAC cache of the first port;
   (e) repeating steps (a) through (d) for all other edges recovered from the interconnected network;
   (f) repeating steps (a) through (e) until the MAC tables in the switches are fully propagated.

6. The method of claim 5 further comprising:
   (g) forming a list of switches that comprise the network;
   (h) determining the MAC address cache for each one of the switches;
   (i) forming from the MAC address caches a list of insiders for every pair of switches;
   (j) determining whether the insider for each pair of switches is a graph edge;
   (k) determining adjacent ones of the graph edges; and
   (l) forming a symmetric adjacency matrix from the graph edges to represent the topology of the network.

7. The method of claim 6, wherein forming a list of insiders further comprises:
   (m) determining for each pair of switches all remaining switches that see that pair of switches;
   (n) forming the list of insiders by determining for each pair of switches the remaining switches that see one of the pair of switches on a first port and the second one of the pair of switches on a second port.

8. The method of claim 7, further comprising
   (o) determining the network data link connections to hosts and routers forming a full network.

9. The method of claim 8, further including:
   (p) determining from the MAC address caches each switch having a port that sees a host or a router but does not see any other switch on that port.

* * * * *